United States Patent [19]
Blomberg et al.

[11] 4,152,030
[45] May 1, 1979

[54] BRAKE WITH ANTI-LOCKING AND REAPPLICATION CONTROL AND METHOD

[76] Inventors: Folke I. Blomberg, Duvstigen 4, S-181 40 Lidingo; Torbjörn Nordström, Skarpbrunnaväg. 35¹, 145 64 Norsborg, both of Sweden

[21] Appl. No.: 795,620

[22] Filed: May 10, 1977

[30] Foreign Application Priority Data

May 24, 1976 [SE] Sweden .................................. 7605863

[51] Int. Cl.² .......................... B60T 8/00; B60T 13/68
[52] U.S. Cl. ............................... 303/115; 137/513.3; 138/42; 138/43; 138/44; 138/45; 138/46; 303/119
[58] Field of Search ............... 303/115, 116, 119, 61, 303/84 R, 84 A; 138/42, 43, 44, 45, 46; 137/513.3

[56] References Cited
U.S. PATENT DOCUMENTS

| | | | |
|---|---|---|---|
| 3,364,821 | 1/1968 | Gephart | 137/513.3 |
| 3,574,416 | 4/1971 | Skoyles | 303/116 |
| 3,731,980 | 5/1973 | Fink | 303/119 |
| 3,819,236 | 6/1974 | Fink | 303/119 |
| 4,068,904 | 1/1978 | Blomberg | 303/115 |

*Primary Examiner*—Trygve M. Blix
*Assistant Examiner*—Reinhard J. Eisenzopf
*Attorney, Agent, or Firm*—Bell, Seltzer, Park & Gibson

[57] ABSTRACT

Apparatus for braking a rotating member which has a fluid pressure responsive brake to which pressurized fluid is supplied for braking the rotating member, an anti-locking device interposed between the brake and the source of supply of fluid pressure for cyclically decreasing and increasing the fluid pressure supplied to the brake, and a control interposed between the brake and the fluid pressure source for limiting the rate of rise of fluid pressure supplied to the brake. Limitation of the rate of rise of fluid pressure applied to the brake governs reapplication of braking forces by the brake and thereby aids in optimizing brake performance.

8 Claims, 8 Drawing Figures

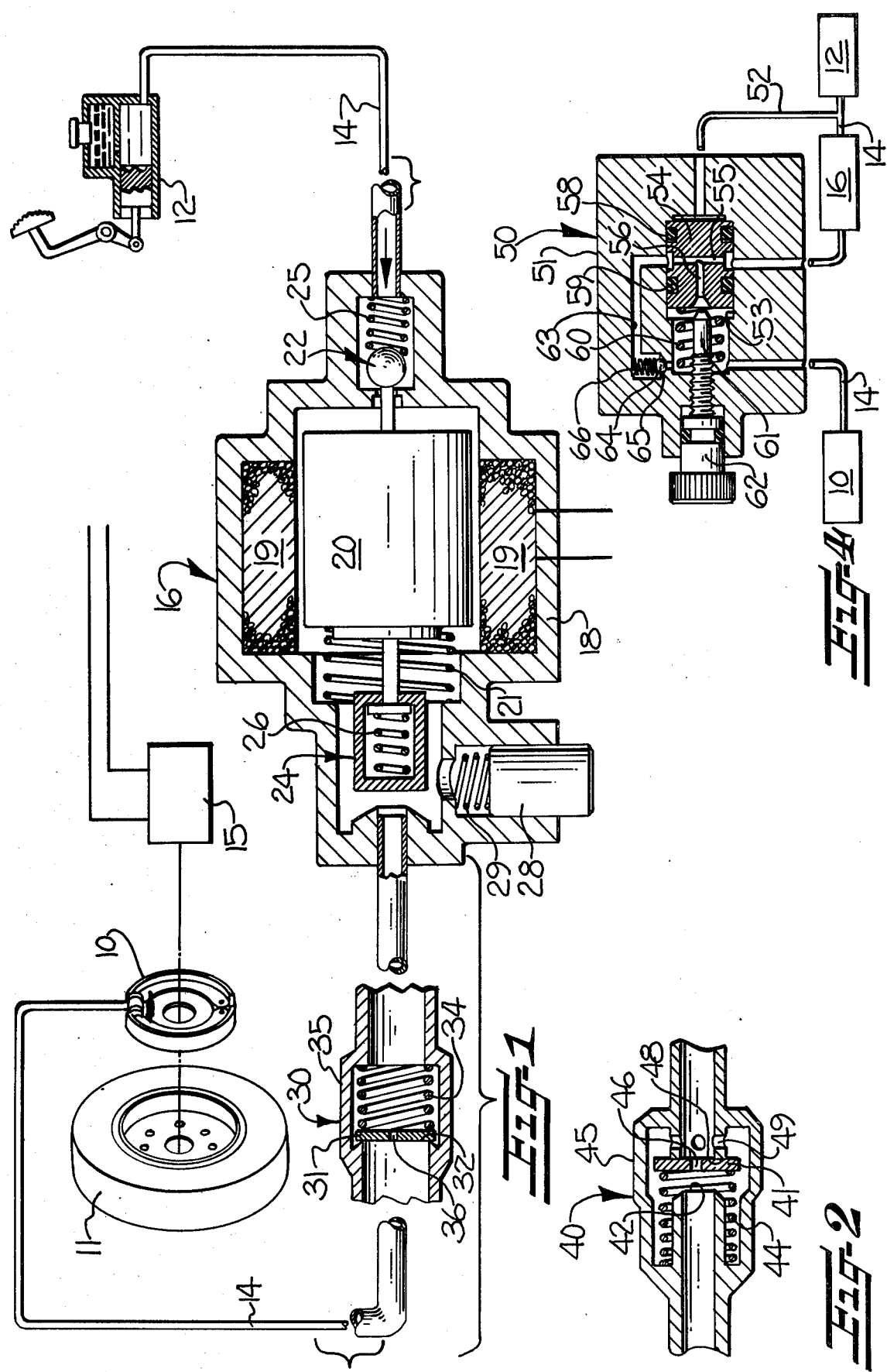

BRAKE WITH ANTI-LOCKING AND REAPPLICATION CONTROL AND METHOD

It has long been known to brake a rotating member through the use of a fluid pressure actuated brake cylinder which exerts braking force. Conventionally, as in an automotive vehicle such as a truck or passenger car, a reservoir is provided for supplying fluid to a braking system which includes a plurality of cylinders and conduits establishing operative communication between the cylinders and the reservoir. In a typical hydraulic fluid braking arrangement, a master cylinder is employed for pressurizing hydraulic fluid actuating the brake cylinders.

Substantial recent attention has been given to the development and incorporation of anti-locking devices into such fluid pressure actuated brake systems. Particularly in connection with braking a wheel of an automotive vehicle, it is known that application of force by a driver to a master cylinder or the like will lead to a rise of fluid pressure supplied to the brake cylinders, with resultant exertion of force braking rotation of the vehicle wheel. In order to avoid dangerous locking tendencies which may occur in connection with excessively heavy braking, particularly on surfaces having low coefficients of friction, anti-lock devices have been proposed and incorporated into vehicle brake systems to block additional increase of pressure at the brake cylinders and relieve the applied pressures which led to the tendency of the vehicle wheel to lock. At least certain anti-locking devices simulate a "pumping" technique known to and used by skilled drivers, by which a cyclically decreasing and increasing fluid pressure is applied through the brake system conduits to the brake cylinders. Such cyclical decrease and increase has the effect of reducing and then reapplying the braking force exerted on a vehicle wheel in such a manner that a slipping wheel having a tendency to lock is permitted to accelerate back toward a wheel speed corresponding to the vehicle speed. Examples of such anti-locking devices will be found in U.S. Pat. Nos. 3,833,097 and 3,989,125 and in U.S. application Ser. No. 657,762 filed Feb. 13, 1976 now U.S. Pat. No. 4,068,904 issued Jan. 17, 1978.

With such "pumping" anti-locking devices, the possibility exists that each cyclic increase in fluid pressure will restore the pressure at the brake cylinder to the full system pressure, thereby requiring the anti-locking device or brake modulator to cyclically decrease pressure from the maximum pressure of the braking circuit. Such demands on an anti-locking device or brake modulator are undesirable, as imposing a requirement that the device or modulator have sufficient pressure relieving capacity for lowering the brake cylinder pressure in each cycle from the circuit pressure to a pressure sufficiently low to relieve the locking tendency for the braked member or wheel so that the vehicle wheel may again accelerate.

Recognizing the above difficulty, it is an object of this invention to control and limit the rate of rise of cyclically increasing fluid pressure in a brake system. In accomplishing this object of the present invention, the pressure relieving components of an anti-locking device or brake modulator do not have to lower a braking pressure from the maximum pressure level of the remainder of a braking system but may operate from a lower pressure level. This characteristic of the present invention facilitates more acceptable and wider use of sensors and modulators which might otherwise be found to have insufficient sensitivity and/or capacity.

Yet a further object of the present invention is to improve the responsiveness of a vehicle brake system including an anti-lock device or modulator which simulates a "pumping" action. In realizing this object of the present invention, interposition of a reapplication control valve between a cyclically expanding and contracting chamber of the anti-lock device or brake modulator facilitates optimizing the rate of deceleration of the braked vehicle by avoiding excessive wheel slip and optimizing wheel slip to such values that frictional forces between the wheel and the road surface approach the maximum attainable under prevailing road conditions.

Some of the objects of the invention having been stated, other objects will appear as the description proceeds, when taken in connection with the accompanying drawings, in which FIG. 1 is an elevation view, partially schematic and partially in section, illustrating an apparatus for braking a rotating member in accordance with this invention and, more particularly, a vehicle wheel braking system of the single line type;

FIG. 2 is a view similar to a portion of FIG. 1, illustrating one modified embodiment of a reapplication control valve means useful in the system of FIG. 1;

FIG. 4 is an elevation view, partially schematic and partially in section, illustrating a differential pressure controlled device for limiting the rate of rise of fluid pressure supplied to a braking means;

Figure 3:
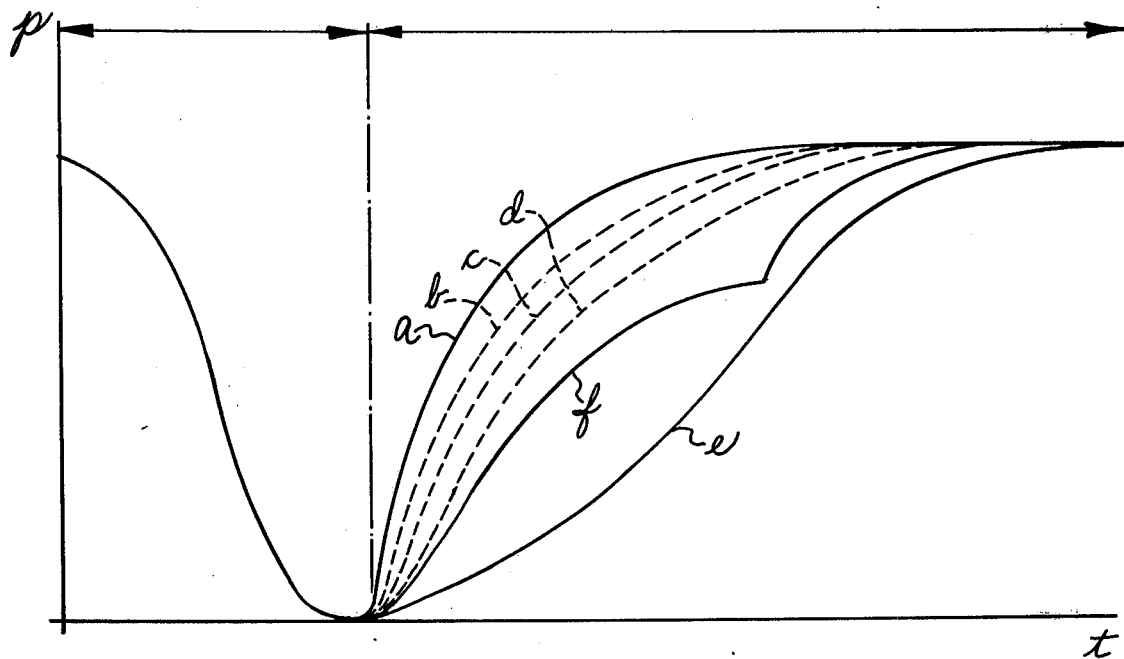
FIG. 3 is a diagram illustrating typical curves for a decreasing pressure phase and an increasing pressure phase for a cycle of decreasing and increasing fluid pressure supplied to a braking means.
Figure 5:
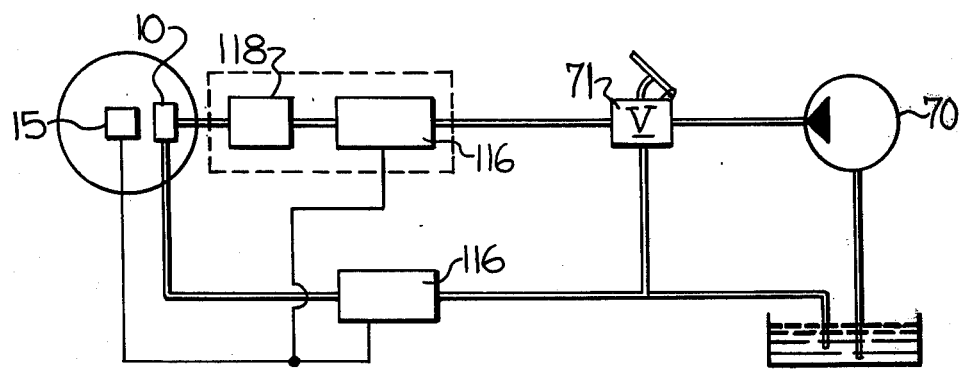
FIG. 5 is a schematic illustration of the use of this invention in a full pressure brake system.

While the present invention will be described more fully hereinafter with reference to the accompanying drawings, it is to be understood at the outset of the detailed description of this invention that is it contemplated that various modifications of the invention as described may be made by persons skilled in the appropriate arts. For that reason, the detailed description is to be read broadly, and not as limiting on the scope of this invention.

As illustrated in FIG. 1, a brake system in accordance with the present invention includes fluid pressure responsive braking means generally indicated at 10 and having a brake cylinder means for exerting force braking rotation of a rotating member, more particularly a vehicle wheel generally indicated at 11. Fluid pressure for braking the wheel 11 is supplied, in the illustrated form, from a hydraulic master cylinder 12 and is transmitted through a conduit means 14 which establishes operative communication between the cylinder of the brake means 10 and a reservoir provided by the master cylinder 12. Sensor means 15 is provided for detecting the rate of retardation of rotation of the wheel 11 and for signalling the occurrence of a rate of retardation in excess of a predetermined rate. A number of such sensors are described in U.S. Pat. No. 3,833,097 and several variations have been illustrated in FIGS. 6-12 of that patent. Persons knowledgable in the arts relating to anti-locking brake control systems will be aware of other sensor means which are known to be suitable for detecting wheel slip or the rate of retardation of a braked rotating member and for signalling electrically and otherwise the occurrence of excessive wheel slip or a rate of retardation in excess of a predetermined rate. A selected one of such sensors is, in accordance with the present invention, operatively connected with the rotating member to be braked, such as the wheel 11, and is connected to electrically signal an anti-locking means generally indicated at 16. The anti-locking means 16, also known as a brake modulator, is constructed and operates in response to the sensor means 15 generally as described in co-pending patent application Ser. No. 657,762 and interested readers are directed to that application for a more complete description and explanation of the brake modulator. To any extent necessary for full understanding of the present application, the description incorporated in that prior application is hereby incorporated by reference into the present description.

As there pointed out, in normal braking operation, hydraulic fluid may freely flow in both directions through the conduit means 14 and through a housing 18 of the brake modulator 16. Thus, normal braking action may occur with pressurization of fluid by the master cylinder 12 and resultant actuation of a wheel cylinder incorporated in the brake means 10. However, should the sensor means 15 electrically signal wheel slip or an excessive rate of retardation of a braked rotating member, a winding 19 within the housing 18 is energized and an armature 20 is displaced (to the left in FIG. 1) against the action of a return spring 21. Such displacement of the armature 20 results in substantially simultaneous closing of first and second controllable one-way valve means, respectively generally indicated at 22 and 24, through the action of respective biasing springs 25, 26. With such closing of the valves 22, 24, the valves are conditioned for blocking passage of flow from the master cylinder 12 to the wheel cylinder through the housing 18, so that any further increase in pressure buildup in the wheel cylinder is prevented.

By the same signal applied to the winding 19, a suitable motive means driving a piston 28 is actuated and the piston 28 begins reciprocatory oscillation against the force of a return spring 29. With reciprocatory oscillation of the piston 28, the fluid pressure supplied to the brake means 10 is decreased. After the fluid pressure has decreased to a certain point, the wheel starts to increase its rotational speed and the sensor then stops signalling. With de-energization of the winding 19, the armature 20 is moved (to the right in FIG. 1) by the return spring 21, allowing fluid to again flow to the brake cylinder. The anti-locking means thus cyclically decreases and increases the fluid pressure applied to the braking means, simulating the "pumping" technique used by skilled drivers to prevent wheel locking.

In accordance with the present invention, the rate of rise of fluid pressure supplied to the brake means 10 is limited to a controlled rate by reapplication valve means generally indicated at 30 and operatively interposed between the brake means 10 and the master cylinder 12. The reapplication valve means 30 may take various specific forms and be positioned at various specific locations, all as will be described more fully hereinafter.

In the form illustrated in FIG. 1, the reapplication valve means 30 incorporates a valve disc 31 which is normally biased against a seat 32 by a spring 34. The disc 31, seat 32 and spring 34 are contained within a housing 35 operatively interposed in the conduit means 14 between the anti-locking means 16 and the brake means 10. One or more holes or apertures 36 in the valve disc 31 permits a limited, restricted flow from the master cylinder 12 to the wheel brake cylinder in the brake means 10, with the rate of flow being determined by the calculated area of the hole or holes 36. As will be appreciated, the valve disc 31 will leave the seat 32 in the event of a cyclical decrease in pressure applied to the wheel cylinder and consequential relieving pressure flow from the wheel brake cylinder toward the master cylinder 12, in order that a sufficiently quick pressure decrease or relieving action can be obtained. However, upon a cyclical increase in fluid pressure applied through the conduit means 14, the valve disc 31 is pressed against the seat 32 and the rate of rise of fluid pressure will be determined by the area of the hole or holes 36.

Referring now more particularly to FIG. 3, the diagram there presented schematically illustrates the function of the apparatus described to this point. In the event that a vehicle driver applies force to master cylinder 12 by pushing a brake pedal, pressurized hydraulic fluid is supplied to wheel cylinders through the conduit means 14 and the anti-locking means 16 or brake modulator. When a locking tendency is imminent, as detected by the sensor means 15, the modulator is actuated and a cyclical increasing and decreasing of fluid pressure applied through the conduit means 14 occurs. The full line a in FIG. 3 illustrates a typical operation comprising a decreasing pressure phase and an increasing pressure phase. As indicated by the full line a, the next point in time when the sensor signals that the modulator or anti-locking means 16 should operate in order to give a new cyclically decreasing fluid pressure phase can be such, depending upon the speed of the sensor or the capacity of the modulator, that the starting or initial pressure at the wheel cylinder may be relatively close to the high pressure applied from the master cylinder 12. However, in accordance with the present invention, the pressure increase is retarded by the reapplication valve means 30 as indicated on FIG. 3 by a dashed line b. The slope of the dashed line b and thus the rate of rise of cyclically increasing fluid pressure depends upon the amount of restriction imposed by the holes 36. Since the pressure increase is thus retarded to a desired extent, in accordance with the present invention, the modulator or anti-locking means 16 will during the next cyclical operation not have to lower the pressure at the wheel cylinder from the same high level as was the earlier case but may work from a lower level depending upon the response time of the sensor and the operation of the anti-locking means 16.

An alternate embodiment for the reapplication valve means 30 of FIG. 1 is illustrated in FIG. 2, at 40, where a housing 45 encloses a valve disc 41, a downstream valve seat 42, and spring 44. The valve disc 41 has one or more holes 46 therein. In distinction from the reapplication valve means 30 of FIG. 1, the disc 41 of the FIG. 2 embodiment is normally urged against an upstream seat 48 by the spring 44. The terms "downstream" and "upstream" are here used with reference to the direction of fluid flowing toward the brake means 10. Hydraulic fluid may normally pass through the reapplication valve 40 partly through the center hole 46 in the valve disc 41 and partly through radially located apertures 49. In connection with increasing fluid pressure caused by an operator applying force to the master cylinder 12, the reapplication valve 40 of FIG. 2 will not be actuated. In the event the rate of rise of cyclically increasing fluid pressure exceeds a predetermined rate above that obtainable by a driver, such as those rates easily obtainable by existing modulators or anti-locking means 16, the valve disc 41 will be moved from the upstream seat 48 against the force of the spring 44 and will seat against the downstream seat 42. With such seating, hydraulic fluid may pass through only the center hole 46 in the disc 41, thereby encountering the predetermined desired restriction which limits the rate of rise of cyclically increasing fluid pressure. As will be appreciated, the spring 44 facilitates accommodation of quick relief of fluid pressure during cyclical decreases thereof.

Limitation on the rate of rise of cyclically increasing fluid pressure applied through the conduit means 14 may also be accomplished by a pressure responsive restrictor means according to this invention and as illustrated at 50 in FIG. 4. As there shown, a housing 51 having internal fluid paths is connected in the conduit means 14 establishing operative communication between the anti-locking means 16 or modulator and the wheel cylinder of the brake means 10 and also, by means of a sensing conduit 52, with the conduit means 14 intermediate the master cylinder 12 and the anti-locking means 16. In a centrally located cylinder 53 within the housing 51 is disposed a piston 54 movable in response to fluid pressures in the sensing conduit 52 and having a crossbore passageway 55 and an axial bore passageway 56. Ring seals 58, 59 encircle the piston 54 on each side of the crossbore passage 55 and seal with the wall of the cylinder 53. By means of a biasing spring 60, the piston 54 is biased toward a normal position (to the right in FIG. 4) in which fluid may pass from the anti-locking means 16 to the wheel cylinder of the brake means 10 by means of the crossbore passageway 55 and the axial bore passageway 56. An adjustable restriction is imposed in such a flow path, by means of a needle valve member 61 which cooperates with the axial bore passageway 56. An adjustment screw 62 is threaded into the housing 51 and, by rotation, gives a primary adjustment for fluid flow rates past the restriction imposed by the cooperation of the needle valve member 61 with the axial bore passageway 56. In response to increased pressures applied from the master cylinder 12, such pressures acting through the sensing conduit 52 and against the piston 54 oppose the force of the biasing spring 60 and move the piston 54 toward the needle valve member 61. Thus, as pressures applied by the master cylinder increase in connection with modulator operation, the restriction imposed between the needle valve member 61 and the axial bore 56 likewise increases due to pressure difference over the piston 54, accomplishing the desired controlled limitation on the rate of rise of cyclically increasing fluid pressures.

In order not to affect release of fluid in conjunction with cyclically decreasing fluid pressures, the housing 51 includes a relief passageway 63 in which a ball check valve member 64 is normally held against a seat 65 by a check valve spring 66. Therefore, when the anti-locking means 16 is pumping fluid from the wheel brake cylinder through the housing 51, the check valve member 64 is unseated and fluid freely flows through the relief passageway 63 and the crossbore passageway 55 to return to the anti-locking means 16.

In normal operation of the forms of the present invention described thus far, braking under conditions which do not lead to a tendency for a vehicle wheel to lock causes the anti-locking means 16 to be inactive and permits free hydraulic fluid transfer from the master cylinder 12 to a wheel cylinder component of the brake means 10 at the beginning of braking operation and from the wheel cylinder to the master cylinder at the end of a braking operation. Such transfer at fluid flow rates below a threshold rate is, in accordance with the present invention, not affected by either the anti-locking means 16 nor the reapplication valves 30, 40, 50. However, when the sensor means 15 detects an excessive rate of retardation, and hence a tendency for wheel locking, the anti-locking means 16 is put into operation and the reapplication valve means 30, 40, 50 retard pressure increase at fluid flow rates above the threshold rate during cyclical decreasing and increasing of fluid pressures. Respective dashed lines b, c and d indicate performance achievable by the first described reapplication valves 30, 40 and similarly reflect the controlled flow characteristics thereof. It will be appreciated by skilled hydraulic circuit designers that the particular curves achieved can be varied by usual design selection of orifice sizes and the like. The curve e is an example of what may be achieved by the pressure sensitive restrictor of FIG. 4, and skilled persons will recognize that the characteristics of such a curve may be varied, for example by changing the shape of the needle valve member 61. Yet a further alternative is the use of a constant flow valve (not shown) which will give basically straight lines, deviating only due to any elastic characteristic of the hydraulic lines and brake.

The present invention further contemplates that reapplication valve means may be incorporated in a full pressure brake system using a hydraulic pump driven by an electric motor or directly by the vehicle engine. One such operating embodiment in accordance with the present invention is illustrated in FIGS. 5 through 8. Thus, the anti-locking means of FIG. 5, generally indicated at 116, is included in a return flow circuit used for draining a wheel brake cylinder upon receiving a sensor signal. In this type of system, a pump 70 generates the brake pressure and the driver operates a valve 71 by actuating a brake pedal. A modulator 116 for such a system comprises two valves, one in the normal ("on") line and one in the drainage ("off") line cooperating with each other so that one is closed when the other one is opened. In accordance with the present invention, the controllable valves of the modulator 116 may incorporate reapplication valve means described hereinafter with reference to FIG. 6 accomplishing the control of the rate of rise of increasing fluid pressure as described hereinabove. Of course, the reapplication valve means may be located outside the modulator, for example between the pump and the modulator unit and may be of any type illustrated in FIGS. 1, 2, 4 or 6. Similarly, the reapplication valve means of FIG. 6, now to be more fully described, may be used in brake systems other than full pressure systems, such as the system of FIG. 1.

Figure 6:
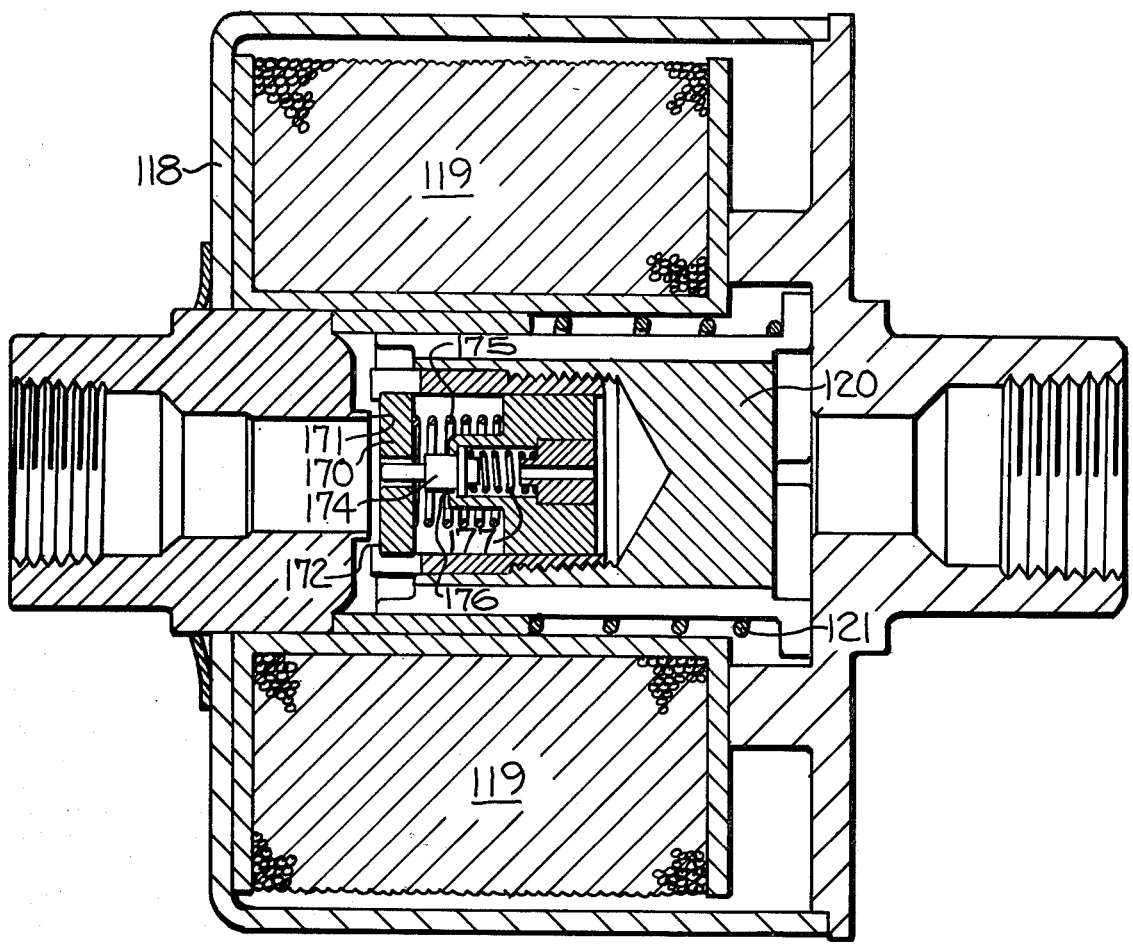
FIG. 6 is a view similar to a portion of FIG. 1, illustrating one operating embodiment of the present invention.
Figure 7:
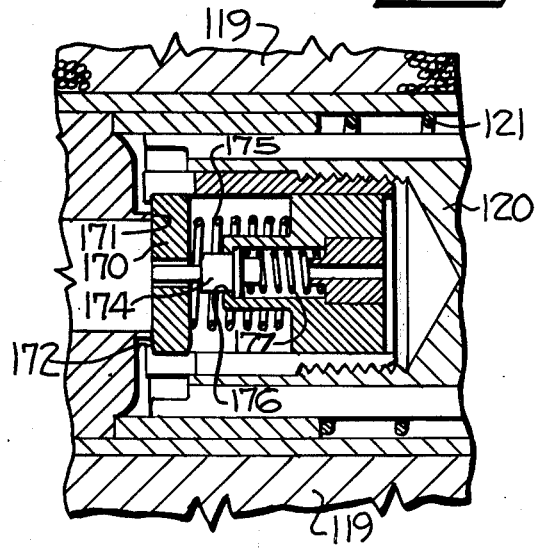
FIG. 7 is a view similar to FIG. 6, showing a portion of the device thereshown, in one operating condition.
Figure 8:
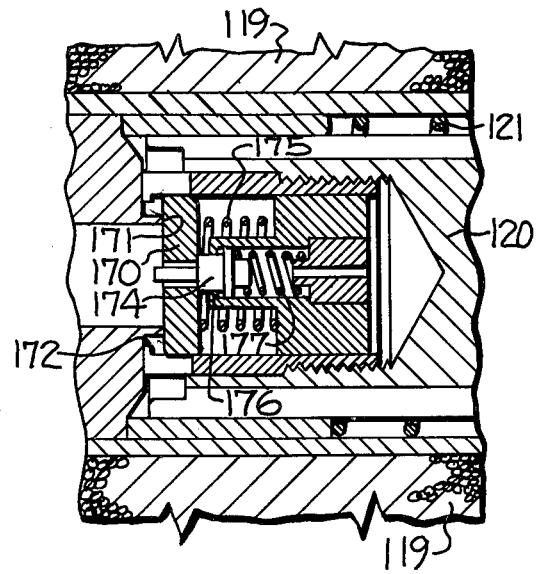
FIG. 8 is a view similar to FIG. 7 showing another operating position of a portion of the device of FIG. 6.

More particularly, and with reference to FIG. 6, a housing 118 includes a winding 119 which, when energized, is capable of moving an armature 120 against the force of a return spring 121. A washer or disc valve member 170 is normally kept from a cooperating seat 171 by engagement thereof with shoulders 172 formed on the armature 120. The normal spacing between the disc valve member 170 and its cooperating seat 171 is a first predetermined distance, on the order of 0.5 mm.

A central seal element 174 penetrates and cooperates with the valve disc member 170. Normally, the cooperation of the seal element 174 and the valve disc 170 is such as to permit fluid flow through restricted areas defined between the portion of the seal element 174 which penetrates the disc 170 and a central opening or hole in the valve disc member 170. However, the seal element 174 is capable of seating against the valve disc member 170 in a sealing manner. The valve disc member 170 is normally biased against its retaining shoulder 172 by an actuating spring 175, while the seal element 174 is similarly biased against retaining shoulders 176 by an actuating spring 177. The seal element 174 and the shoulders 176 therefore are dimensioned and disposed relative to the valve disc member 170 and its cooperating seat 171 in such a manner that over travel of the armature 120 beyond the position at which the disc 170 is seated is necessary in order to seat the seal element 174 against the disc 170. Typically, such over travel may be on the order of 0.5 mm beyond the position at which the disc 170 is seated upon its cooperating seat 171.

Under normal braking conditions, with the winding 119 not energized, hydraulic braking fluid flows freely through the housing 118 and the controllable valves. Upon energization of the winding 119 by a retardation sensor (as described hereinabove) the armature 120 shifts (to the left in FIG. 6) to bring about seating of the disc valve member 170 on its seat 171 (see FIG. 7), followed by seating of the sealing member 174 against the disc valve member 170 (see FIG. 8). With the controllable valve in the position shown in FIG. 8 and thus blocking continued fluid flow to a wheel cylinder the other valve of the modulator is opened and relief of pressure applied to the wheel cylinder occurs as has been described hereinabove.

Upon the winding 119 again being de-energized, the armature 120 shifts (to the right in FIG. 6) under the combined force of the return spring 121, the disc return spring 175 and the sealing member return spring 177 toward the normal position. However, the force of those springs is balanced against a force resulting from any pressure differential across the housing 118 and acting on the area of the disc valve member 170. In the event that such pressure differential is sufficiently high, the force of the return springs is incapable of overcoming the pressure forces and only the sealing member 174 is unseated, with the controllable valve moving to the position of FIG. 7. With only the sealing member 174 unseated, only a restricted flow path through the housing 118 is opened, until such time as the pressure differential diminishes to a more normal range. Upon the pressure differential diminishing, the armature 120 completes its stroke in returning to the normal position, the disc valve member 170 is unseated, and the valving of the anti-lock means is fully opened to allow full flow of fluid. Such a sequence gives rise to a reapplication curve with a "knee", as shown by line f in FIG. 3, occurring where the valving opens to allow full flow.

In the drawings and specification, there has been set forth a preferred embodiment of the invention, and although specific terms are employed, they are used in a generic and descriptive sense only and not for purposes of limitation.

That which is claimed is:

1. In apparatus for braking a vehicle wheel which has fluid pressure responsive braking means for braking rotation of the wheel, means for supplying fluid pressure for braking the wheel, and anti-locking means operatively interposed between said braking means and said supplying means for cyclically decreasing and increasing the fluid pressure supplied to said braking means, said anti-locking means having expansible chamber means for controllably cyclically expanding and contracting the volume thereof, that improvement which comprises means operatively interposed between said braking means and said supplying means for controlling the rate of rise of fluid pressure supplied to said braking means, said controlling means having pressure responsive restrictor means operatively communicating with said supplying means and responsive to pressure of fluid supplied to said chamber means for controllably restricting, intermediate said chamber means and said braking means, the flow of fluid to said braking means.

2. In apparatus for braking a vehicle wheel which has fluid pressure responsive braking means for braking rotation of the wheel, means for supplying fluid pressure for braking the wheel, and anti-locking means operatively interposed between said braking means and said supplying means for cyclically decreasing and increasing the fluid pressure supplied to said braking means, that improvement which comprises means operatively interposed between said braking means and said supplying means for controlling the rate of rise of fluid pressure supplied to said braking means and including means responsive to the pressure difference across said anti-lock means for controlling said rate of rise.

3. Apparatus for braking a rotating member and comprising fluid pressure actuated brake cylinder means for exerting force braking rotation of the member, reservoir means for supplying fluid to the cylinder means, conduit means for establishing operative communication between the cylinder means and the reservoir means, sensor means for detecting the rate of retardation of rotation of the member and for signalling the occurrence of a rate of retardation in excess of a predetermined rate, expansible chamber means interposed in said conduit means between said reservoir means and said cylinder means for normally accommodating free flow of fluid between said reservoir means and said cylinder means through said conduit means and said chamber means, said chamber means being operatively connected to said sensor means and responsive thereto for cyclically decreasing and increasing the fluid pressure applied through said conduit means to said cylinder means in response to a signalled excessive rate of retardation and thereby for releasing braking forces otherwise retarding rotation of the member, and valve means interposed in said conduit means between said reservoir means and said cylinder means, said valve means having a valve member for permitting relatively large volume rates of flow, a seal element cooperating with said valve member for accommodating relatively small volume rates of flow, and actuator means operatively connected with said valve member and said seal element and said sensor for limiting the rate of rise of cyclically increasing fluid pressure in response to a signalled excessive rate of retardation and during such time as the differential in pressure between points upstream and downstream of said valve means exceeds a determined differential.

4. A method for avoiding locking a vehicle wheel comprising applying pressurized fluid to a brake for a wheel, sensing a tendency of the wheel to lock, cyclically releasing and reapplying pressurized fluid to the wheel by operating a modulator in response to said tendency being sensed, controlling the rate of rise of fluid pressure during said reapplying step, and adjusting the rate of rise during the reapplying step by adjusting the fluid conduit size in response to the pressure differential across said modulator.

5. A method of braking a vehicle wheel comprising supplying pressurized fluid to a brake for a wheel, sensing any occurrence of braked wheel slip, cyclically decreasing and increasing the fluid pressure at the brake in response to sensed excessive wheel slip for thereby controlling locking of the wheel, limiting the rate of rise of the cyclically increasing fluid pressure to a first rate during such time as the differential in pressure between the pressure supplied and the pressure at the brake exceeds a determined differential, and permitting the cyclically increasing fluid pressure to rise at a rate greater than the first rate upon the differential being reduced to below the determined differential.

6. In apparatus for braking a vehicle wheel which has fluid pressure responsive braking means for braking rotation of the wheel, means for supplying fluid pressure for braking the wheel, and anti-locking means operatively interposed between said braking means and said supplying means for cyclically decreasing and increasing the fluid pressure supplied to said braking means, that improvement which comprises a valve operatively interposed between said braking means and said supplying means for both (a) normally accommodating free flow of fluid from said braking means and (b) controlling the rate of rise of fluid pressure supplied to said braking means.

7. In an apparatus for braking a vehicle wheel which has fluid pressure responsive braking means for braking rotation of the wheel, means for supplying fluid pressure for braking the wheel, and anti-locking means operatively interposed between said braking means and said supplying means for cyclically decreasing and increasing the fluid pressure supplied to said braking means, that improvement which comprises valve means operatively interposed between said braking means and said supplying means for normally accommodating free flow of fluid from said braking means while controlling the rate of rise of fluid pressure supplied to said braking means, said valve means having a housing with an upstream seat and a downstream seat there within, a valve member mounted within said housing for movement into and out of engagement with said seats, and biasing means biasing said valve member toward engagement with said upstream seat, said seats and said valve member and said biasing means cooperating for permitting free flow of fluid to and from said braking means at rates below a threshold rate and for permitting free flow of fluid from said braking means at rates above said threshold rate and for restricting flow of fluid to said braking means at rates above said threshold rate.

8. In apparatus for braking a vehicle wheel which has fluid pressure responsive braking means for braking rotation of the wheel, means for supplying fluid pressure for braking the wheel, and anti-locking means operatively interposed between said braking means and said supplying means for cyclically decreasing and increasing the fluid pressure supplied to said braking means, that improvement which comprises means operatively interposed between said braking means and said supplying means for controlling the rate of rise of fluid pressure supplied to said braking means and including means for continuously adjustably controlling said rate of rise.

* * * * *